United States Patent [19]

Budrose

[11] 3,784,763

[45] Jan. 8, 1974

[54] UNIVERSAL RECORDING CARD

[75] Inventor: Charles R. Budrose, Melrose, Mass.

[73] Assignee: Bio-Dynamics, Inc., Cambridge, Mass.

[22] Filed: Apr. 26, 1971

[21] Appl. No.: 137,319

[52] U.S. Cl. 179/100.2 MD, 35/35 C, 179/100.2 T, 235/61.11 D

[51] Int. Cl.... G11b 5/80, G11b 21/04, G11b 23/18

[58] Field of Search .................................... 35/35 C; 179/100.2 MD, 100.2 T; 235/61.11 D

[56] References Cited

UNITED STATES PATENTS

| | | | |
|---|---|---|---|
| 2,849,542 | 8/1958 | MacChesney | 179/100.2 MD |
| 3,307,274 | 3/1967 | Glaser | 35/35 C |
| 3,145,268 | 8/1964 | Whitney et al. | 179/100.2 MD |

*Primary Examiner*—Cardillo, Jr., Raymond F.
*Attorney*—Morse, Altman & Gates

[57] ABSTRACT

A card is provided with at least two recording sections on which an audio generated signal is recorded. The audio generated signal is recorded on one section in a first direction at a first rate and is recorded on the other section in a second direction at a second rate. The audio generated signal is recorded simultaneously on each section by means of a recording device having at least two recording heads. Each recording head is mounted on a slidable platform and each platform is operatively connected to a driver in such a way that one head is driven in the first direction at the first rate and the other head is driven in the second direction at the second rate.

5 Claims, 7 Drawing Figures

INVENTOR
CHARLES R. BUDROSE
BY
Morse, Altman & Oates
ATTORNEYS

INVENTOR
CHARLES R. BUDROSE
BY
Morse, Altman & Oates
ATTORNEYS

UNIVERSAL RECORDING CARD

BACKGROUND OF THE INVENTION

1. Field of Invention:

The present invention relates generally to recording cards and, more particularly, is directed towards a universal recording card having at least two sections of which a common audio generated signal is recorded. Furthermore, the invention provides an apparatus for simultaneously recording the common audio generated signal on each recording card section.

2. Description of the Prior Art:

Various devices for recording and reproducing audio tones on magnetic tape are available from a number of manufactures. One type device is a cassette tape recorder which may be adapted to function as an educational device. An adaptor, which operates to receive a card having a magnetic tape strip thereon, is positioned within the recorder in place of the cassette. The card is inserted in the adaptor and audio generated signals recorded on the strip are reproduced as audible tones. Since manufacturers record and reproduce audio generated signals at different speeds and in different directions, such cards have suffered from the disadvantage that they are not compatible with all adapted cassette tape recorders.

SUMMARY OF THE INVENTION

An object of the present invention is to provide a universal recording card on which audio generated signals are recorded and which is compatible with audio reproducing devices having individualized operating characteristics. The recording card is characterized by a recording stratum having at least two sections, a common audio generated signal being recorded on each section. Notwithstanding the fact that the signals recorded on both sections represent the same audio signal, the recorded signals on each section are distinguishable from one another by the rate and/or direction in which the audio generated signal is recorded.

Another object of the invention is to provide a device for simultaneously recording a common audio generated signal on at least two recording sections of a recording card at different rates and in opposite directions. The device is characterized by at least two recording heads, one each of which is mounted in contiguity and mating registration with one each of the card recording sections. Each head is mounted on a slidable platform and each platform is operatively connected to a driver in such a way that one head is driven in a first direction at a first rate and the other head is driven in a second direction at a second rate. The first direction is opposite the second direction and the first rate is a multiple of the second rate. Accordingly, the audio generated signal is recorded in one section in the first direction at the first rate and is recorded on the other section in the second direction at the second rate.

The invention accordingly comprises the system possessing the construction, combination of elements, and arrangement of parts that are exemplified in the following detailed disclosure, the scope of which will be indicated in the appended claims.

BRIEF DESCRIPTION OF THE DRAWINGS

For a fuller understanding of the nature and objects of the present invention, reference should be had to the following detailed description taken in connection with the accompanying drawings wherein.

DETAILED DESCRIPTION OF THE INVENTION

Figure 1:
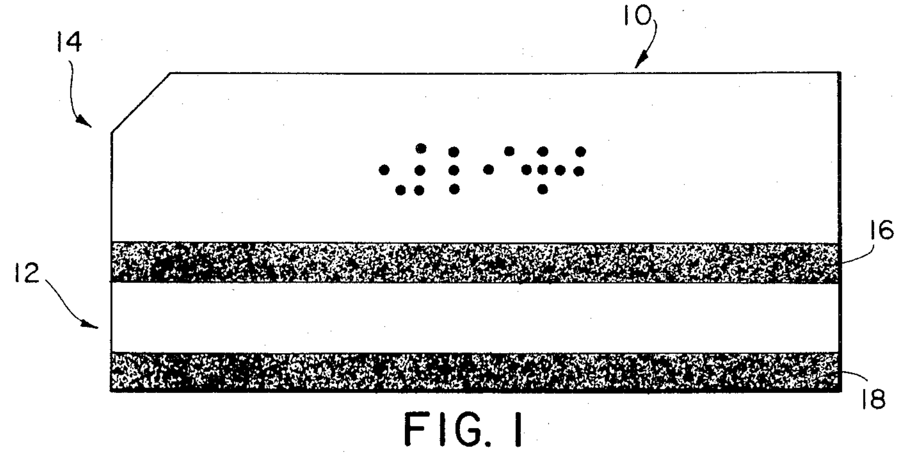
FIG. 1 is a side elevation of a two section card embodying the present invention.

Referring now to the drawings, particularly FIG. 1, there is shown a web 10, describing a substantially rectangular profile, having a recording medium 12 located at a lower portion thereof and a sensory indicia 14 located at an upper portion thereof. In the preferred embodiment, web 10 is composed of fibrous material such as cardboard and sensory indicia 14 is a tactile indicia such as a braille impression. Recording medium 12 includes a pair of sections 16 and 18 on which there is recorded like audio generated signals. Strips 16, 18 being disposed in spaced parallel relationship with respect to eachother and the lower edge of card 10. In the illustrated embodiment, by way of example, each section 16 and 18 is a magnetic tape strip having a plastic-base tape coated with magnetized ferro-magnetic powder. The magnetic coating on each strip is magnetized in a pattern which corresponds to undulations in a common sound wave. That is, a common audio generated signal, in the frequency range of 400 Hz to 20KHz, for example, is recorded on each strip 16 and 18. Notwithstanding the fact that the same audio generated signal is recorded each strip, the direction in which the signal is recorded and the rate at which the signal is recorded on strip 16 is distinguishable from the direction in which the signal is recorded and the rate at which the signal is recorded on strip 18. In other words, a like audio generated signal is recorded on each strip in such a manner that the signal recorded on one strip is contained within a particular area of that strip and the signal recorded on the other strip is contained within a particular area of that strip, the recorded area on one of the strips being smaller than the recorded area on the other strip. Braille 14 represents the same intelligence information recorded on each strip. As hereinafter described, the signal is recorded simultaneously on strips 16 and 18 by means of a recording device 20.

Figure 2:
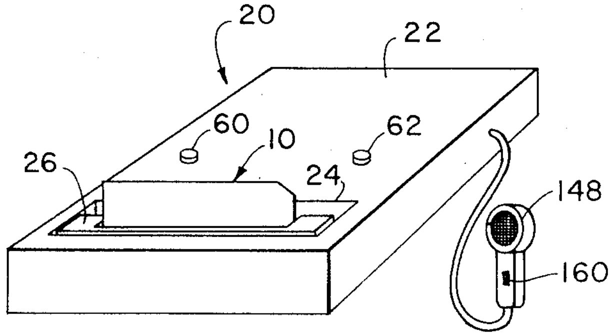
FIG. 2 is a perspective of a recording device made according to the invention for simultaneously recording an audio generated signal on each recording section of the card illustrated in FIG. 1.

Referring now to FIG. 2, it will be seen that recording device 20 comprises a casing 22 having a substantially rectangular profile in which the electrical and mechanical components for simultaneously recording sound wave undulations on strips 16 and 18 are housed. Casing 22 is formed with a slit 24 which operates to receive card 10. A card securing mechanism 26 is mounted to casing 22 in registration with slit 24.

Figure 3:
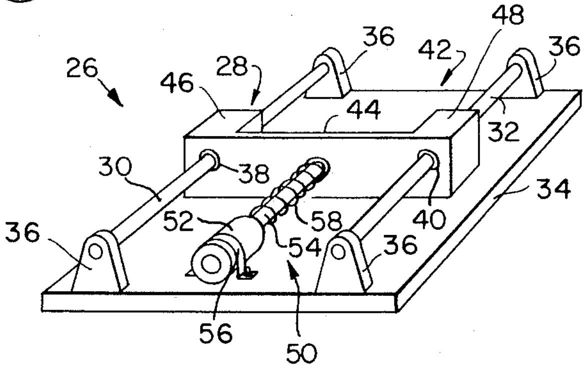
FIG. 3 is a perspective of the card retaining mechanism of FIG. 2.
Figure 4:
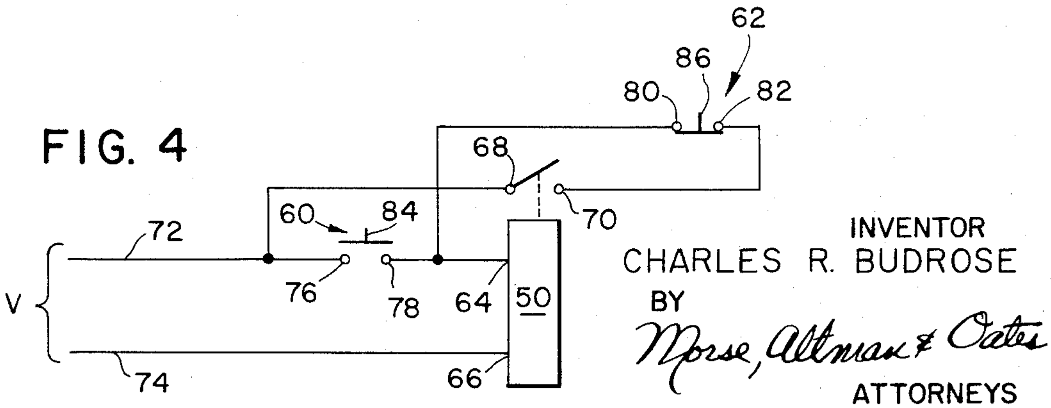
FIG. 4 is a schematic diagram of the control circuit for the mechanism of FIG. 3.

As best shown in FIG. 3, mechanism 26 includes a carriage 28 which is slidably mounted on a pair of guides 30 and 32. Opposite ends of guides 30 and 32 are mounted to a platform 34 by means of supports 36. Carriage 28 is formed with a pair of through holes 38 and 40 which operate to slidably receive guides 30 and 32, respectively. One side of carriage 28 is cutaway at 42 to form a substantially rectangular cavity 44 having flanges 46 and 48 on opposite sides thereof. Cavity 44 and flanges 46, 48 define a guideway for card 10, i.e., when card 10 is inserted within slit 24, flanges 46 and 48 operate to engage opposite side edges of card 10. Carriage 28 is reciprocated along guides 30 and 32 by means of an actuator 50.

Actuator 50 comprises a stationary body 52 and a reciprocating arm 54. A bracket 56 is provided for mounting body 52 to platform 34. Arm 54 is fastened to carriage 28 by means of a bias element 58, for example a tension spring. When actuator 50 is energized, arm 54 is extended from body 52 and carriage 28 is driven away from body 52; and when actuator 50 is de-energized, arm 54 is retracted into body 52 and carriage 28 is pulled towards body 52. Actuator 50 is energized and de-energized by means of momentary switches 60 and 62, respectively.

In the illustrated embodiment, actuator 50 is a solenoid having a pair of terminals 64, 66 and a pair of normally open contacts 68, 70. Solenoid 50 is energized when a voltage potential V is applied across terminals 64 and 66 via lines 72 and 74, respectively. Normally opened contacts 76, 78 of momentary switch 60 is connected serially in line 72. Contact 76 is connected to contact 68 and contact 78 is connected to contact 70 through normally closed contacts 80, 82 of momentary switch 62. When a plunger 84 of momentary switch 60 is depressed, voltage potential V is applied across terminals 64 and 66 of solenoid 50, in consequence, arm 54 is extended from body 52 and contacts 68, 70 are closed. When plunger 84 is released, solenoid 50 is maintained in the energized state by means of closed contacts 68, 70 and normally closed contacts 80, 82. If a plunger 86 of momentary switch 62 is depressed, the circuit through closed contacts 80, 82 is broken, in consequence, solenoid 50 is de-energized and arm 54 is retracted into body 52. As hereinafter described, the sound wave undulations are recorded on magnetic strips 16 and 18 card 10 when arm 54 is in the extended position, magnetic strips 16 and 18 engaging a pair of recording heads 88 and 90.

Figure 5:
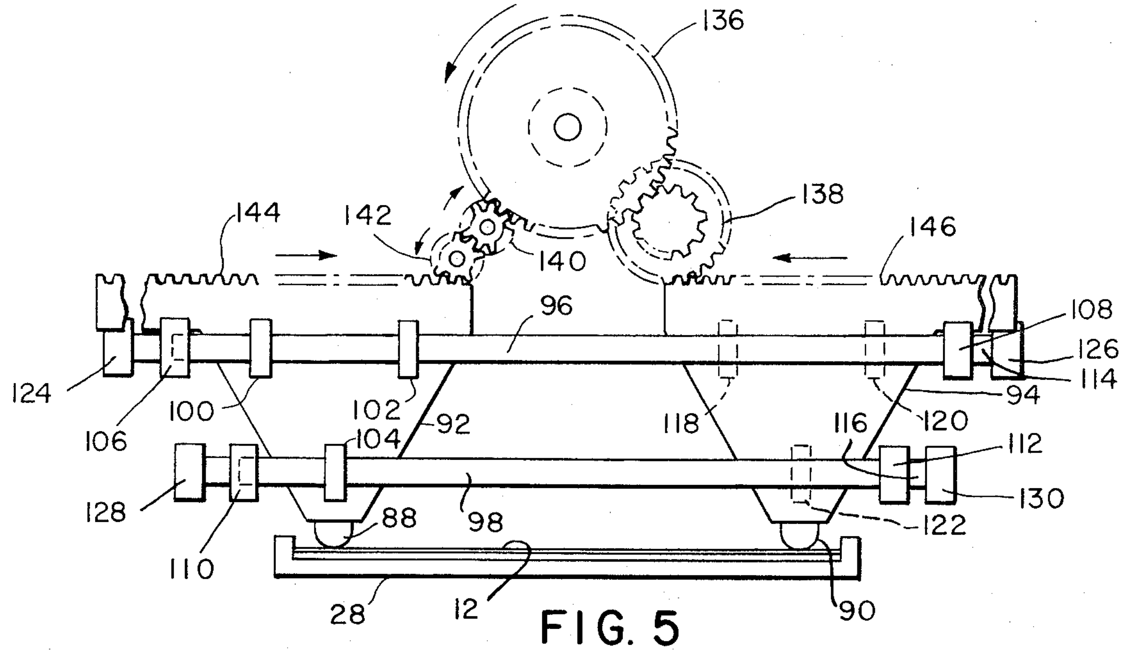
FIG. 5 is a top plan of the mechanical components of FIG. 2.
Figures 6, 7:
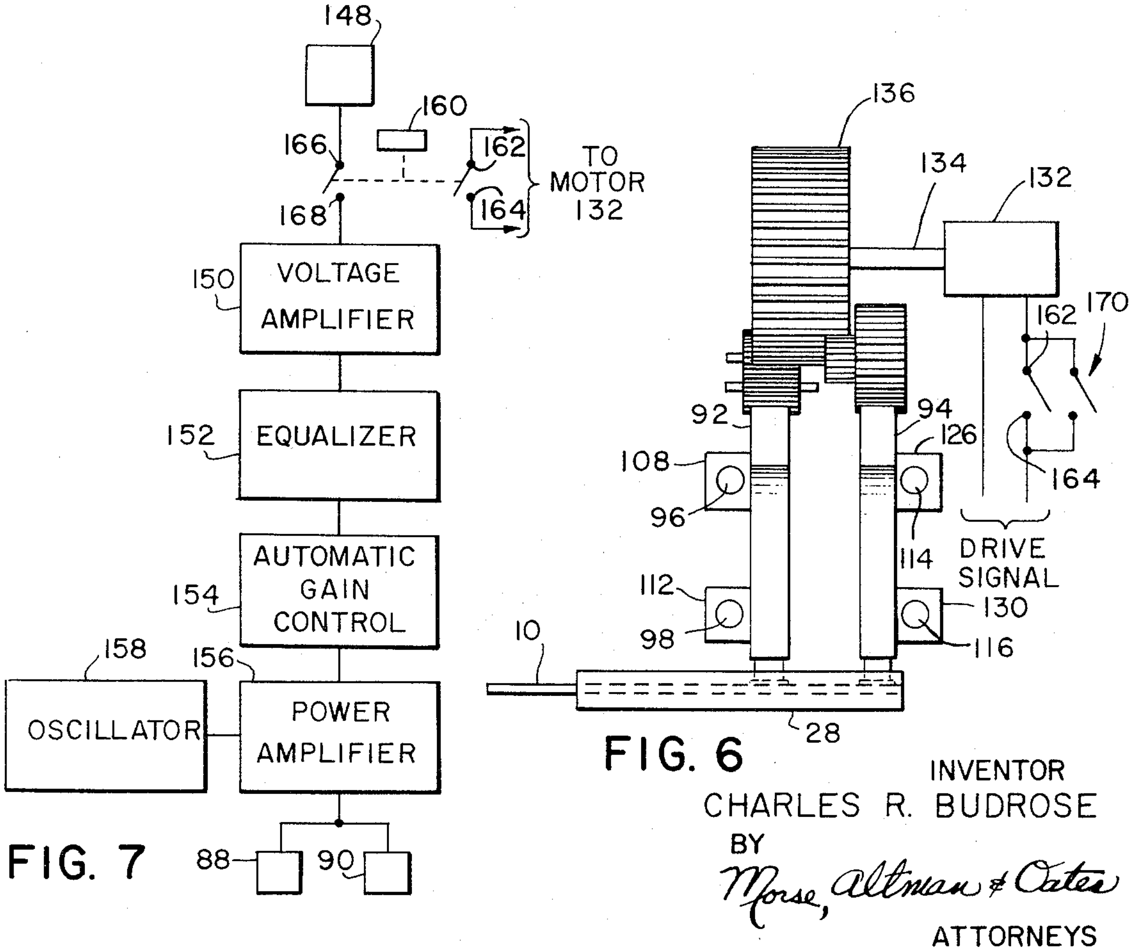
FIG. 6 is a side elevation of FIG. 6.
FIG. 7 is a block and schematic diagram illustrating the audio recording circuitry of FIG. 2.

Referring now to FIGS. 5 and 6, it will be seen that recording heads 88 and 90 are mounted on slidable platforms 92 and 94, respectively. Platforms 92 and 94 are mounted within casing 22 in such a manner that, when arm 54 is in the extended positions, head 88 is in contiguity and mating registration with strip 16 and head 90 is in contiguity and mating registration with strip 18. Platform 92 is slidably mounted to a pair of guides 96, 98 which are mounted in spaced parallel relationship with respect to each other. Guide 96 is slidably received within a pair of guideways 100, 102 and guide 96 is slidably received within a guideway 104; guideways 100, 102, and 104 being affixed to platform 92. Opposite ends of guide 96 are mounted to fixed supports 106 and 108, and opposite ends of guide 98 are mounted to fixed supports 110 and 112. Platform 94 is slidably mounted to a pair of guides 114, 116 which are mounted in spaced relationship with respect to each other. Guide 114 is slidably received within in a pair of guideways 118, 120 and guide 116 is slidably received within a guideway 122; guideways 118, 120, and 122 being affixed to platform 94. Opposite ends of guide 114 are mounted to fixed supports 124 and 126, and opposite ends of guide 116 are mounted to fixed supports 128 an 130. It will be readily appreciated that, as viewed in FIG. 5, platform 92 and 94 are disposed in parallel planar relationship and are slidable along a plane parallel to the longitudinal axis of card 10.

As best shown in FIG. 6, platforms 92 and 94 are connected to a driver 132, for example a servo motor having a shaft 134 which is provided with a driving gear 136 at the free end thereof. Gear 136 is connected to platform 94 by means of a pinion 138 and to platform 92 by means of a gear 140 and a pinion 142. Platform 92 is provided with a rack 144 which is in engagement with pinion 142 and platform 94 is provided with a rack 146 which is in engagement with pinion 138. It is to be understood that, in alternate embodiments, the recording heads are coupled to servo motor 132 by means other than an arrangement of gears, for example, an endless belt and pulley arrangement. As best shown in FIG. 5, by way of example, when gear 136 is driven in a counterclockwise direction, pinion 138 is driven in a clockwise direction and platform 94 is driven from right to left. Also, when gear 136 is driven in a counterclockwise direction, gear 140 is driven in a clockwise direction, pinion 142 is driven in a counterclockwise direction, and platform 92 is driven from left to right.

From the foregoing description, it will be realized that, when servo motor 132 is energized, recording heads 88 and 90 are driven simultaneously in opposite directions along the longitudinal axes of strips 18 and 16, respectively. In addition, it will be realized that platforms 92 and 94 are drivingly connected to servo motor 132 in such a manner that platform 92 is driven at a rate which is different from the rate at which platform 94 is driven. Accordingly, when an audio generated signal is applied to recording heads 88 and 90, the sound wave undulations are recorded on strips 16 and 18 at different rates and in different directions as specified by the coupling arrangement between servo motor 132 and platforms 92, 94. In one example, the coupling arrangement between servo motor 132 and platforms 92 and 94 is such that platform 92 is driven at a rate of 30 inches per second and platform 94 is driven at a rate of 7.5 inches per second. In this example, the area on strip 16 which contains the recorded signal is larger than the area on strip 18 which contains the same signal. It is to be understood that, in alternate embodiments, the coupling arrangement between servo motor 132 and platforms 92 and 94 is such that each platform is driven at a different rate, for example, 30, 15, 7.5, 3.75, or 1.875 inches per second. The audio recording circuitry for converting sound wave undulations to recordable signals is shown in FIG. 7.

Referring now to FIG. 7, the audio recording circuit comprises an audio sensor 148, a voltage amplifier 150, an equalizer 152, an automatic gain control 154, a power amplifier 156, an oscillator 158, and recording heads 88 and 90. Audio sensor 148, for example a microphone, is provided with a switch 160 having normally opened contacts 162, 164 and 166, 168. When switch 160 is actuated, contacts 162, 164 are closed and servo motor 132 is energized by a driving signal which is applied thereto through closed contacts 162, 164. In consequence, platforms 92 and 94 are driven in their respective directions at their respective rates. In addition, when switch 160 is actuated, an audible signal is presented to microphone 148. The sensed audio signal at the output of microphone 148 is applied to voltage amplifier 150 through contacts 166, 168 which are closed when switch 160 is actuated. The amplified signal at the output of voltage amplifier 150 is fed to equalizer 152 which, in a conventional manner, generates signals representing the recording characteristics. The signals at the output of equalizer 152 are applied to power amplifier 156 via automatic gain control 154 which controls the over-all signal level. The signal at the output of power amplifier 156 is fed to recording heads 88 and 90. Each recording head, actuated by amplifier 156, magnetizes the magnetic coating on its correlative strip in a pattern which corresponds to the undulations in the sound wave sensed in microphone 148. That is, the magnetic flux pattern on each strip consists of a series of magnetized sections. In order to overcome nonlinearities of the strips, a high frequency signal or bias from oscillator 158, typically in the range of 50–150 KHz, is fed to each recording head together with the audio generated signal.

From the foregoing description, it will be realized that like audio generated signals are recorded on strips 16 and 18 in opposite directions and at different rates. When the recording process is completed, a switch 170 is actuated and motor 132 is energized in such a manner that platforms 92 and 94 are driven to their initial starting positions and readied for another recording cycle.

Since certain changes may be made in the foregoing disclosure without departing from the scope of the invention herein involved, it is intended that all matter contained in the above description are depicted in the accompanying drawings be construed in an illustrative and not in a limiting sense.

What is claimed is:

1. A recording medium for audio reproducing devices comprising a web having at least a pair of parallel magnetic tracks on which identical data is recorded on a substantially smaller area on one of said tracks than on the other of said tracks by the process steps of converting sound wave undulations to electrical signals; applying said electrical signals to at least a pair of relatively movable recording heads; relatively moving one of said recording heads with respect to one of said tracks at a rate in one direction; relatively moving the other of said recording heads with respect to the other of said tracks at a substantially greater rate in an opposite direction; and recording said data on said pair of tracks in opposite directions and at distinctly different rates.

2. A device for simultaneously recording common sound wave undulations on at least first and second magnetic recording strata mounted on a card, said device comprising:

a. means for converting said sound wave undulations to recordable signals;

b. at least first and second recording head means electrically connected to said converting means for magnetizing said magnetic recording strata in a pattern which corresponds to said sound wave undulations;

c. at least first and second slidable platform means, said first recording head means mounted on said first platform means in contiguity and mating registration with said first magnetic recording stratum, said second recording head means mounted on said second platform means in contiguity and mating registration with said second magnetic recording stratum; and d. means operatively connected to said first and second platform means for driving said first platform in a first direction at a first rate and for driving said second platform in a second direction at a second rate, said sound wave undulations recorded on said first magnetic stratum in said first direction at said first rate and on said second magnetic stratum in said second direction at said second rate, said first direction opposite said second direction and said first rate a multiple of said second rate.

3. The device as claimed in claim 2 including card securing means for positioning said recording strata in and out of contiguity with said recording head means.

4. The device as claimed in claim 3 wherein said card securing means includes:

a. a platform;

b. carriage means slidably mounted to said platform, said carriage means formed with a cavity operating to receive said card;

c. means operatively connected to said carriage means for driving said carriage into extended and retracted positions, said recording strata being in contiguity with said recording head means when said carriage is in said extended position, said recording strata being out of contiguity with said recording head means when said carriage is in said retracted position; and d. means operatively connected to said driving means for controlling said driving means.

5. The device as claimed in claim 3 wherein said driving means includes:

a. first rack means mounted to said first platform means;

b. second rack means mounted to said second platform means;

c. first pinion means operatively connected to said first rack means;

d. second pinion means operatively connected to said second rack means;

e. servo motor means having an extending shaft;

f. first gear means secured to said shaft and operatively connected to said first pinion means; and g. second gear means operatively connected to said first gear means and said second pinion means;

h. said first gear being rotated in a third direction, said second gear and first pinion rotating in a fourth direction in response to said first gear rotating in said third direction, said second pinion rotating in said third direction in response to said second gear rotating in said fourth direction, said first rack being driven in said first direction in response to said first pinion rotating in said fourth direction and said second rack being driven in said second direction in response to said second pinion rotating in said third direction.

* * * * *